W. H. WRIGHT.
ANTIFRICTION BEARING.
APPLICATION FILED SEPT. 15, 1915.

1,194,918.

Patented Aug. 15, 1916.

WITNESSES:
Walter H. Kelley.
Clara Bowers

INVENTOR
William Hamilton Wright
BY
J. Wm Ellis
ATTORNEY

UNITED STATES PATENT OFFICE.

WILLIAM HAMILTON WRIGHT, OF PORT DOVER, ONTARIO, CANADA, ASSIGNOR TO MARY ELIZABETH WRIGHT, OF PORT DOVER, ONTARIO, CANADA.

ANTIFRICTION-BEARING.

1,194,918. Specification of Letters Patent. Patented Aug. 15, 1916.

Application filed September 15, 1915. Serial No. 50,799.

*To all whom it may concern:*

Be it known that I, WILLIAM HAMILTON WRIGHT, a citizen of the United States of America, and a resident of the town of Port Dover, county of Norfolk, and Province of Ontario, Canada, have invented certain new and useful Improvements in Antifriction-Bearings, of which the following is a full, clear, and exact description.

My invention relates generally to antifriction bearings, and more particularly to that type of bearing in which tapered rollers are employed.

The general object of my invention has been to provide a bearing of this class which shall be very compact, and thus occupy a comparatively small space.

Moreover, I have sought to provide a unitary bearing, the parts of which shall be so constructed and united as to make it impossible for any of them to become disengaged or misplaced.

Moreover, my bearing is simple in its construction and cheap to manufacture. It is so designed that it cannot get out of order or adjustment.

Figure 1:
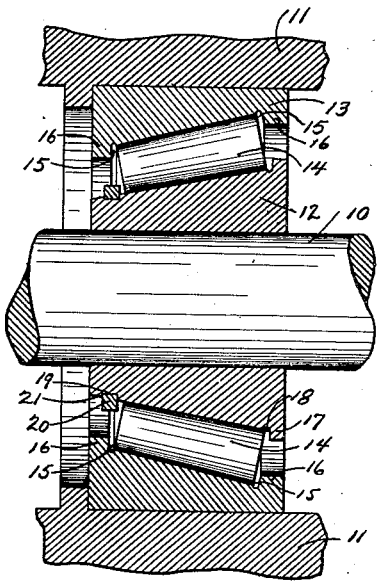
Figure 3:
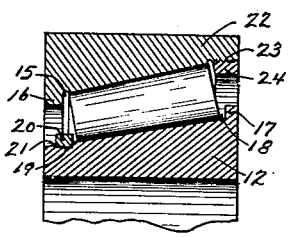
Figure 2:
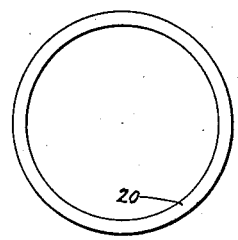

The above objects and advantages have been accomplished by the device shown in the accompanying drawings, forming a part of this application, in which:

Figure 1 is a sectional view through one of my bearings. Fig. 2 is a side elevation of the shoulder ring thereof. Fig. 3 is a fragmentary, sectional elevation of a modified form of my bearing.

In the drawings, 10 represents a fragmentary portion of the shaft to which my bearing is attached, and 11 is a fragmentary portion of the casing or hub of the wheel. Carried by the shaft 10 is an inner bearing cone 12, and arranged within the hub 11 is the outer bearing cone 13 of my device. Disposed between the inner and outer bearing cones are a plurality of rollers 14. These rollers have smooth, tapered peripheries and the bearing cones are provided with surfaces which correspond with the taper of the rollers. The outer bearing cone 13 is preferably provided at each end of its bearing surface with an annular groove 15. At each end of the cone is provided an inwardly extending and integral shoulder 16, which prevents the rollers 14 from moving endwise within the ring when they are loose or when being assembled.

The inner bearing cone 12 is provided at its outer end with an outwardly extending and integral shoulder 17. Between this shoulder and the end of the bearing surface is preferably provided an annular groove 18. The tapered surface of the cone 12 is preferably continued to the extreme end at the smaller side of the cone, which makes it very simple and easy to assemble the bearing parts. Provided in the smaller end of the cone 12, and at the end of its bearing surface, is an annular and preferably square-shaped groove 19. After the rollers 14 have been placed in position between the inner and outer bearing cones 12 and 13, respectively, a solid, lock shoulder ring 20, which has been previously sized and heated, is passed over the shoulder 21, formed at the outer edge of the groove. Before this shoulder ring is placed in the position shown in the drawings it is made with a diameter somewhat less than the diameter of the bottom of the groove in which it is to be placed and with a thickness slightly less than the width of that groove. It is then expanded by heat after which it is slipped over the end of one of the bearing cones until it is immediately in line with such groove. In this position it is cooled in any suitable way and thereby contracted. Since the diameter of the ring before it is slipped into place is less than the diameter of the bottom of the groove and since the thickness of the ring is less than the width of the groove, when the ring is contracted by cooling, the surplus of metal in the body of the groove expands until it fills the groove and locks it against rotation and lateral movement. This construction binds the entire bearing together and makes it impossible for any parts thereof to become loose or displaced.

In the modified form shown in Fig. 3, the outer bearing cone 22 has its end 23 at the larger side of the bearing surface of substantially the same diameter as the larger diameter of the bearing surface, and provided with interior screw-threads. 24 is a screw-threaded shoulder ring, which is screwed into the end 23 of the outer bearing cone where it is locked in position by any well known means. By means of this detachable shoulder ring the bearing may be taken apart if it is ever desired or found necessary.

Obviously, some modifications of the details herein shown and described may be made without departing from the spirit of my invention or the scope of the appended claims, and I do not wish to be limited to the exact embodiment herein shown and described.

Having thus described my invention, what I claim is:

1. An anti-friction bearing comprising an inner bearing cone and an outer bearing cone, rollers disposed between said bearing cones, said inner bearing cone being provided with an annular groove, and a solid lock shoulder ring contracted tightly upon the bottom of the groove and being rigidly held in the groove against rotation and lateral movement.

2. An anti-friction bearing comprising an inner bearing cone and an outer bearing cone, rollers disposed between said bearing cones, said inner bearing cone being provided at one end with an outwardly extending shoulder and at the other end with an annular groove, a solid lock shoulder ring contracted tightly upon the bottom of the groove and being rigidly held in the groove against rotation and lateral movement, and said outer bearing cone being provided at each end with an inwardly extending shoulder.

3. An anti-friction bearing comprising an inner bearing cone and an outer bearing cone, rollers disposed between said bearing cones, said outer bearing cone having an inner diameter at its larger end which is substantially the same as the larger diameter of its bearing surface, a screw-threaded shoulder screwed into the larger end of said cone, the smaller end of said inner bearing cone being provided with an annular groove, and a lock shoulder ring, having an innner diameter substantially the same as the diameter of the groove, shrunk into said groove.

4. An anti-friction bearing comprising an inner bearing cone and an outer bearing cone, rollers disposed between said bearing cones, said outer bearing cone having an inner diameter at its larger end which is substantially the same as the larger diameter of its bearing surface, a screw-threaded shoulder screwed into the larger end of said cone, the smaller end of said inner bearing cone being provided with an annular groove, a lock shoulder ring, having an inner diameter substantially the same as the diameter of the groove, shrunk into said groove, and said outer bearing ring being provided at its smaller end with an inwardly extending shoulder.

In testimony whereof, I have hereunto signed my name in the presence of two subscribing witnesses.

WILLIAM HAMILTON WRIGHT.

Witnesses:
 J. WM. ELLIS,
 WALTER H. KELLEY.